United States Patent
Calo Lopez et al.

(10) Patent No.: US 11,487,279 B2
(45) Date of Patent: Nov. 1, 2022

(54) METHOD FOR OPTIMIZING THE POWER ENHANCEMENT OF PHOTOVOLTAIC SOLAR PLANTS USING SMART PREVENTIVE AND PREDICTIVE MAINTENANCE

(71) Applicants: Antonio Calo Lopez, Seville (ES); Hugo Jose Rodriguez San Segundo, Seville (ES); Cristina De Vicente Suso, Seville (ES)

(72) Inventors: Antonio Calo Lopez, Seville (ES); Hugo Jose Rodriguez San Segundo, Seville (ES); Cristina De Vicente Suso, Seville (ES)

(73) Assignees: Antonio Calo Lopez, Seville (ES); Cristina De Vincente Suso, Seville (ES)

( * ) Notice: Subject to any disclaimer, the term of this patent is extended or adjusted under 35 U.S.C. 154(b) by 422 days.

(21) Appl. No.: 16/611,371

(22) PCT Filed: May 17, 2018

(86) PCT No.: PCT/ES2018/070362
§ 371 (c)(1),
(2) Date: Nov. 6, 2019

(87) PCT Pub. No.: WO2018/211163
PCT Pub. Date: Nov. 22, 2018

(65) Prior Publication Data
US 2020/0159204 A1    May 21, 2020

(30) Foreign Application Priority Data
May 19, 2017    (ES) .................. ES201730710

(51) Int. Cl.
*G05B 23/02*    (2006.01)
*H02S 50/15*    (2014.01)

(52) U.S. Cl.
CPC .......... *G05B 23/0283* (2013.01); *H02S 50/15* (2014.12)

(58) Field of Classification Search
None
See application file for complete search history.

(56) References Cited

U.S. PATENT DOCUMENTS

2011/0140532 A1* 6/2011 Cherukupalli .......... H02S 50/00
                                                                307/77
2012/0299528 A1* 11/2012 Scarmozzino ............ H02J 7/35
                                                                320/101
(Continued)

FOREIGN PATENT DOCUMENTS

CN    103595351 A    2/2014
CN    204392177 U    6/2015
(Continued)

OTHER PUBLICATIONS

English translation of Hopf et al. German Patent Publication No. DE 102013112988 published May 28, 2015.*

(Continued)

*Primary Examiner* — Bernard G Lindsay
(74) *Attorney, Agent, or Firm* — Hayes Soloway PC

(57) ABSTRACT

The invention is a method to optimize solar photovoltaic power plant repowering by making use of the smart predictive and preventive maintenance which detects failures in modules or in cells within modules, i.e., aerial inspections by infrared thermography and/or electroluminescence. In the method object of the invention, the detected failed modules are separated in different types of failures: A—irreversible; B—reversible and C—partly reusable. Repowering consists on substituting modules of type A for new, more powerful (Continued)

ones, and re-group them series-connected within the same strings (1). Modules with type B failures are repaired and installed back in their original place, and modules C are either re-grouped in series-strings, or substituted by new, more powerful modules, also series connected in strings (1).

1 Claim, 1 Drawing Sheet

(56) References Cited

U.S. PATENT DOCUMENTS

| | | | |
|---|---|---|---|
| 2015/0229269 A1 | 8/2015 | Rand et al. | |
| 2015/0288188 A1* | 10/2015 | Keshner | H01L 31/02021 307/52 |
| 2016/0134232 A1* | 5/2016 | Ben-Al-Lal | H02S 40/34 438/4 |
| 2017/0184524 A1* | 6/2017 | Uetaki | G01J 5/0066 |

FOREIGN PATENT DOCUMENTS

| | | |
|---|---|---|
| CN | 104883128 A | 9/2015 |
| EP | 3136090 A1 | 3/2017 |
| KR | 20150022119 A | 3/2015 |
| KR | 20150022121 A | 3/2015 |

OTHER PUBLICATIONS

Parlak et al. 'An Efficient Reconfiguration Method based on Standard Deviation for Series and Parallel Connected PV Arrays' 3rd International Conference on Renewable Energy Research and Applications, pp. 457-461, IEEE, 2014, Oct. 19-22, 2014.*

Hu et al. 'Efficiency Improvement of Nonuniformly Aged PV Arrays' IEEE Transactions on Power Electronics, vol. 32, No. 2, Feb. 2017.*

Manuel Dalsass, "Correlation Between the Monitoring Data of a Photovoltaic Power Plant and Module Defects Detected by Drone-Mounted Thermography", Nov. 2, 2015, 1793-1798, 31st European Photovoltaic Solar Energy Conference and Exhibition, ISBN: 978-3-936338-39-3.

Marc Kontges, "Performance and Reliability of Photovoltaic Systems: Review of Failures of Photovoltaic Modules", Mar. 2014, 1-140, International Energy Agency Photovoltaic Power Systems Programme, IEA International Energy Agency.

Nrel, "Best Practices in Photovoltaic System Operations and Maintenance", Dec. 2016, 1-128, National Renewable Energy Labratory, U.S. Department of Energy.

* cited by examiner

METHOD FOR OPTIMIZING THE POWER ENHANCEMENT OF PHOTOVOLTAIC SOLAR PLANTS USING SMART PREVENTIVE AND PREDICTIVE MAINTENANCE

CROSS-REFERENCE TO RELATED APPLICATIONS AND PRIORITY

This patent application claims priority from PCT Patent Application No. PCT/ES2018/070362 filed May 17, 2018, which claims priority from ES Patent Application No. P201730710 filed May 19, 2017. Each of these patent applications are herein incorporated by reference in its/their entirety.

FIELD OF THE INVENTION

The invention is framed in the technical sector of renewable energies, more concretely in the field related so solar photovoltaic energy. Within this field, it is framed within its operation and maintenance segment.

BACKGROUND OF THE INVENTION

Over 90% of the current solar photovoltaic market is based on the so-called "crystalline" technology. These solar modules are composed of crystalline silicon solar cells, both multicrystalline and monocrystalline. They are connected to one another through an electrical connection, usually in series. Furthermore, within a solar power plant the modules are series-connected to one another in strings of up to a certain number of modules, which depend on the wished voltage and current. Each one of these strings is series- or parallel-connected to others, until the final, complete solar photovoltaic power plant is formed.

According to international reports, such as the one issued by the International Energy Agency, in 2017 there were over 300 Gigawatts peak (GWp) of cumulated installed solar photovoltaic power worldwide. 60% corresponds to big, ground-mounted power plants over one megawatt peak (MWp) in power.

The profitability of these solar plants is especially sensitive to failures in solar modules, as it is increasingly based on price competitiveness, and therefore on ever smaller margins. The main failures occurring in solar modules are well known for many years, both at cell and at module level. One of the last reports updating the potential solar module and cell failures is the one carried out by the International Energy Agency PhotoVoltaic Systems Programme (IEA-PVPS), entitled "Review of Failures of Photovoltaic Modules" and issued in March 2014. This report stated that approximately 2% of the total existing modules will fail after year 10-12 of operation and before the end of its lifetime. The main consequence of any of these failures is that, as several cells and several modules are series-connected, the failure in only one cell or only one module can "turn down" the whole series and cause a higher or lower loss in performance. These failures are generally of electric nature, and are owed to different causes, many of which can be detected by the higher increase in temperature at the affected areas by means of thermography techniques based on infrared emission (IR), or by the lower electrical conductivity of the affected areas, measured by electroluminescence emission (EL).

The preventive maintenance mostly carried out so far, however, has been rather addressed to avoid soiling (dirt accumulation), or to revising the electrical connections at the AC/DC inverter, conservation of cabling, etc., than to detect failures inside the modules or solar cells. The introduction of IR and EL techniques that allow for an early detection, and therefore a smart predictive maintenance, has only very recently started being popular with the raise of unmanned aerial vehicles or drones, which allow for a profitable inspection velocity. Until the introduction of drones, inspections were carried out on the ground and was intensive in consumption of time and resources, and therefore unable to be introduced into a standard maintenance plan. The raise of such techniques is accompanied by a raise in patent applications dedicated to photovoltaic power plant inspection methods, preferably with drones, both using IR (as in, for instance, patents KR20150022121 y KR20150022119), EL (patents CN104883128, CN204392177 y CN103595351), and both (patent US20150229269). Furthermore, their use for maintenance purposes has been for instance also introduced in the last recommendations in the report "Best Practices in Photovoltaic System Operation and Maintenance" by the National Renewable Energy Laboratory of the U.S. (NREL). Its second and up to now last edition is from December 2016. Even a specific standard on IR measuring in solar plants was approved as recently as June 2017: the first edition of international standard IEC Technical Specification (TS) 64426-3, entitled "Photovoltaic Systems—Requirements for Testing, Documentation and Maintenance—Part 3: Photovoltaic Modules and Power Plants—Outdoor Infrared Thermography", recommends (does not require as compulsory) a thermographic inspection every four years maximum, or more frequent inspections under circumstances suggesting potential failures of risk of fire, such as in big rooftop photovoltaic plants. All these documents are setting the base for a smart predictive maintenance for the early detection of failures in modules, and we will see further improvements in the coming years.

The ultimate goal of this predictive maintenance is to detect those modules with failures in time. However, as of today, there is no clear method regarding what to do exactly with these modules, how to manage their substitution, repair, or whether it is simply better to let them be.

On the other hand, this whole development is not being exploited to its full potential, which is repowering of solar power plants. Today, when, in order to obtain higher performance, repowering of solar plants is considered, it mainly refers to the substitution of the totality of the old solar modules, of less power, by new, more powerful modules, taking advantage of the already existing infrastructure. This consideration is only made in case of complete plant failure, or, more commonly, at the end of its lifetime. Until the authors know, a more optimized repowering method has been proposed, much less involving the data obtained in plant maintenance.

The present invention proposes a method to carry out an optimized repowering continuously along a solar power plant's lifetime, by using the new, profitable methods of smart predictive and preventive maintenance, such that the knowledge and optimum management of those modules which fail is used to constantly reorganize the solar power plant, with the ultimate goal to generate the highest production of electricity at all times. And thus, to guarantee the highest profitability of the investment.

SUMMARY OF THE INVENTION

The present invention is a method to optimize the repowering of a solar photovoltaic power plant by using smart preventive and predictive maintenance based on failure detection by aerial both thermography (IR) and electroluminescence (EL).

Said optimized repowering method differs from the current standard repowering in several aspects:

It is not applied only at a certain point in time, for instance at the end of the plant's lifetime, but is carried out continuously.

It does not substitute all modules, including those which are working and giving their full power, but focuses only on those modules that start to fail, are predicted to fail in the short term, or are failing completely.

Therefore, it optimizes the initial investment on modules that are still working, as they will belong to the plant until their whole performance is obtained (i.e., until the end of their lifetime, or until they fail).

And it also minimizes the investment in repowering, which is made gradually and only on those areas of the plant which present worse performance.

In order to carry out a correct repowering optimization, it must be taken into account that not all types of module failures lead to the same consequence. Depending on the type of failure, this can be:

a.) Irreversible, and then the module must be substituted for a new one, which, due to the advance in technology, will always have more power.

b.) Reversible, and then the module can be repaired and the same power recovered.

c.) Partially reversible, for instance in those modules in which a string stops working, but it does not affect the total functioning of the module, nor puts it the plant operation at risk, thus leading to a still useful product, but of less power.

It must also be considered that, for an optimum solar plant operation, series-connected strings must have modules of very similar power (with power variation among them having a standard deviation of ±5%), and these strings, on their turn, must be parallel-connected to others of different power, preferably, if possible, even to a separate inverter.

The method of the present invention consists on the following steps:

1. Carry out an inspection of the plant, for instance by aerial thermography and/or electroluminescence.
2. Analyze the data taken during the inspection.
3. Detect the modules presenting failures according to categories A, B and C mentioned above.
4. Substitute modules in category A by new ones, which will have more power.
5. Repair modules in category B, recovering their original power.
6. Group modules A, B and C per power rating, and re-locate them such that each series-connected string contains modules of very similar powers, with a maximum standard deviation of ±5%. If using lower power C modules were not profitable, they would be destined to other uses out of the power plant (selling them to other users, for instance, thus becoming a further income), and they would be substituted for more powerful new ones, which would be grouped accordingly.
7. Repeat the process with the stipulated frequency, for instance, annually during the regular smart maintenance inspections, such that a continuous plant optimization is carried out.

DESCRIPTION OF EXAMPLE EMBODIMENTS

Figure 1:
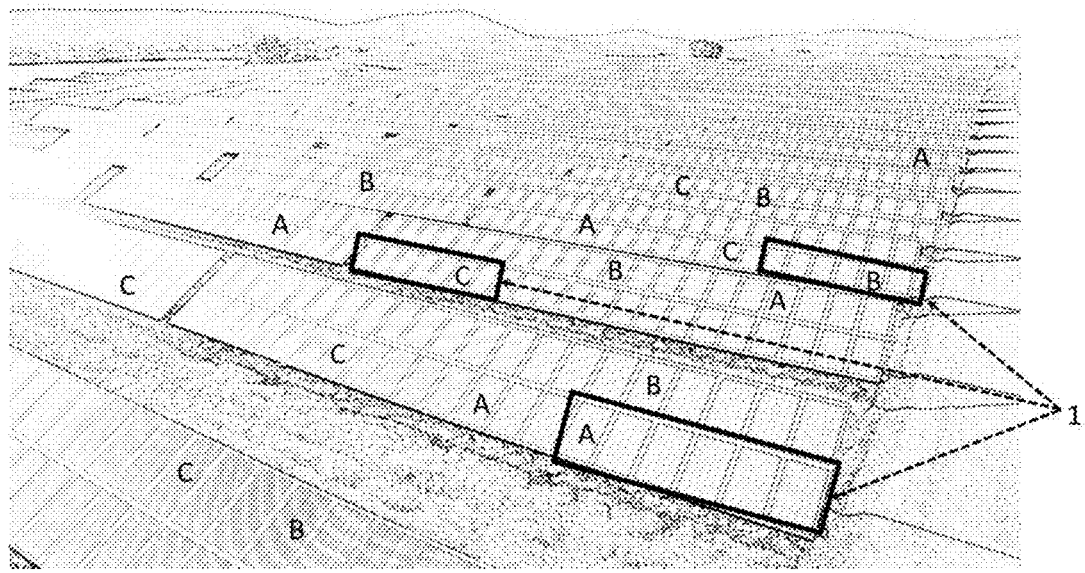
FIG. 1 shows the modules of a solar plant after an inspection, at which a certain number of modules with type A failure (irreversible), another number of type B modules (reversible) and another number of type C modules (partly reversible) have been found, all of which distributed at random along the solar power plant. The rectangles (1) show several module strings inside the plant, wherein the modules are series-connected.
Figure 2:
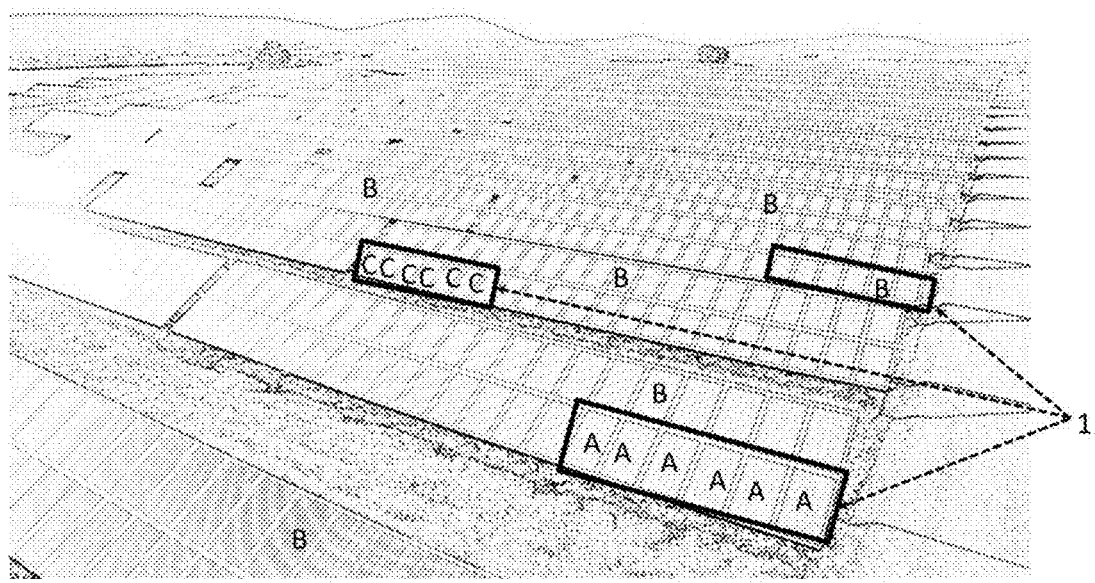
FIG. 2 shows the modules of a solar plant after repowering has been implemented. Modules with type A failures have been substituted for new, more powerful ones, line in the same series-connected string (1), separated from the other strings by parallel connection. Modules with type B failures have been repaired and placed back in their original places, as they have recovered their original power and do not affect the string they were in. And modules with type C failures have been re-grouped within the same series-connected string (1), separated from the other strings by parallel connection.

In one possible, but non-exclusive embodiment, a 10 MWp, ground-mounted solar photovoltaic power plant is formed by 40.000 modules of 250 Wp each, distributed in 1,000 strings of 40 series-connected modules each.

Through an aerial thermography inspection that took place as part of the smart annual predictive and preventive maintenance, the following failed modules were detected:

400 modules with type A failures (irreversible).
240 modules with type B failures (reversible).
160 modules with type C failures, 80 of which lost half their power (thus staying at 125 Wp), and the remaining 80 lost one fifth of their original power (thus staying at 200 Wp).

With the repowering method, in this embodiment, the 400 type A modules are substituted for new generation modules, of 300 Wp each, and are grouped in 10 strings of 40 series-connected modules each.

The 240 type B modules are repaired, gain their original power back and are placed at the same places they occupied before the inspection.

The 160 type C modules are re-grouped and distributed into four strings, two with 40 modules each with new power of 125 Wp per module, and another two of with 40 modules each with new power of 200 Wp per module.

This way, the solar power plant keeps working at its optimum, and a repowering from 10 MWp (nominal power, though it would be less, as 800 modules were not working properly) to 10.006 MWp is achieved.

In another possible, but non-exclusive configuration, with the same number and type distribution of failed modules, those modules with failures of type A and B follow the same procedure, whereas the 160 modules with failures of type C are sold, and substituted in the plant by new ones of 300 Wp each, distributed in four strings (1) of 40 series-connected modules each. The achieved repowering reaches now 10,028 MWp.

The invention claimed is:

1. A method to optimize repowering of solar photovoltaic power plants through predictive and preventive maintenance in which:

a. in a first step, an aerial thermographic infrared and/or electroluminescent inspection is carried out to detect failed modules;
b. during the analysis of the results of said inspection, failed modules are classified in each of the following three types of failure: A—irreversible, B—reversible and C—partly reversible;

c. modules with failure type A are substituted by new ones, of more power, which are grouped and series-connected within strings and their power range has a standard deviation lower than ±5%;
d. modules with failure type B are repaired and their original power recovered, and, once repaired, they are put back in their original position within the power plant;
e. modules with failure type C are either re-grouped according to their new power which is always lower than their original power, in groups within strings, where they are series-connected and their power range has a standard deviation lower than ±5%, or they are destined to other power plants and are substituted by new modules, of higher power, which are grouped within strings, where they are series-connected and their power range has a standard deviation lower than ±5%.

* * * * *